US009541653B2

(12) United States Patent
Iwashita et al.

(10) Patent No.: US 9,541,653 B2
(45) Date of Patent: Jan. 10, 2017

(54) RADIATION IMAGING APPARATUS AND RADIATION IMAGING SYSTEM

(71) Applicant: CANON KABUSHIKI KAISHA, Tokyo (JP)

(72) Inventors: Atsushi Iwashita, Saitama (JP); Toshio Kameshima, Kumagaya (JP); Tomoyuki Yagi, Honjo (JP); Katsuro Takenaka, Honjo (JP); Hideyuki Okada, Honjo (JP); Sho Sato, Saitama (JP); Eriko Sato, Tokyo (JP); Takuya Ryu, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/189,281

(22) Filed: Feb. 25, 2014

(65) Prior Publication Data

US 2014/0239187 A1    Aug. 28, 2014

(30) Foreign Application Priority Data

Feb. 28, 2013  (JP) ................................ 2013-040031

(51) Int. Cl.
   *G01T 1/00*  (2006.01)
   *G01T 1/17*  (2006.01)
   (Continued)

(52) U.S. Cl.
   CPC ........ *G01T 1/17* (2013.01); *H04N 5/32* (2013.01); *H04N 5/357* (2013.01); *H04N 5/3575* (2013.01);
   (Continued)

(58) Field of Classification Search
   CPC ........... G01T 1/17; G01T 1/247; H04N 5/378; H04N 5/32; H04N 5/3575; H04N 5/3577; H04N 5/357
   (Continued)

(56) References Cited

U.S. PATENT DOCUMENTS 6,801,598 B2 * 10/2004 Tashiro ................... A61B 6/00
                                                            250/205
6,952,015 B2  10/2005 Kameshima
                   (Continued)

FOREIGN PATENT DOCUMENTS

JP   2000-183320 A    6/2000
JP   2002-543684 A   12/2002
                   (Continued)

OTHER PUBLICATIONS

English language machine translation of JP 2010-264085 A.*
(Continued)

*Primary Examiner* — David Porta
*Assistant Examiner* — Edwin Gunberg
(74) *Attorney, Agent, or Firm* — Fitzpatrick, Cella, Harper & Scinto

(57) ABSTRACT

A radiation imaging apparatus includes a pixel array in which a plurality of pixels which detects radiation are arrayed to form a plurality of rows and a plurality of columns, a detection circuit which detects information having correlation to a radiation dose to the pixel array and output a detection signal corresponding to the information, and a control unit which detects radiation irradiation to the pixel array based on a plurality of integrated values obtained by integrating one of the detection signal and a result of processing applied to the detection signal in a plurality of integral intervals and control the pixel array in accordance with the detection.

36 Claims, 11 Drawing Sheets

(51) Int. Cl.
  *H04N 5/32* (2006.01)
  *H04N 5/357* (2011.01)
  *H04N 5/378* (2011.01)
  *G01T 1/24* (2006.01)

(52) U.S. Cl.
  CPC ............ *H04N 5/3577* (2013.01); *H04N 5/378* (2013.01); *G01T 1/247* (2013.01)

(58) Field of Classification Search
  USPC ........................................................ 250/394
  See application file for complete search history.

(56) References Cited

U.S. PATENT DOCUMENTS

| | | |
|---|---|---|
| 7,002,157 B2 | 2/2006 | Kameshima |
| 7,138,639 B2 | 11/2006 | Kameshima |
| 7,379,615 B2 | 5/2008 | Allouche |
| 7,381,963 B2 | 6/2008 | Endo et al. |
| 7,386,089 B2 | 6/2008 | Endo et al. |
| 7,408,167 B2 | 8/2008 | Kameshima et al. |
| 7,421,063 B2 | 9/2008 | Takenaka et al. |
| 7,476,027 B2 | 1/2009 | Takenaka et al. |
| 7,491,960 B2 | 2/2009 | Takenaka et al. |
| 7,514,663 B2 | 4/2009 | Yagi et al. |
| 7,514,690 B2 | 4/2009 | Endo et al. |
| 7,541,591 B2 | 6/2009 | Endo et al. |
| 7,564,038 B2 | 7/2009 | Endo et al. |
| 7,573,038 B2 | 8/2009 | Yokoyama et al. |
| 7,573,041 B2 | 8/2009 | Kameshima et al. |
| 7,592,599 B2 | 9/2009 | Kameshima |
| 7,613,277 B2 | 11/2009 | Takenaka et al. |
| 7,645,995 B2 | 1/2010 | Yagi et al. |
| 7,683,337 B2 | 3/2010 | Takenaka et al. |
| 7,705,911 B2 | 4/2010 | Kameshima |
| 7,724,874 B2 | 5/2010 | Kameshima et al. |
| 7,732,776 B2 | 6/2010 | Takenaka et al. |
| 7,732,778 B2 | 6/2010 | Yokoyama et al. |
| 7,786,448 B2 | 8/2010 | Endo et al. |
| 7,791,034 B2 | 9/2010 | Kameshima et al. |
| 7,839,977 B2 | 11/2010 | Kameshima et al. |
| 7,850,367 B2 | 12/2010 | Takenaka et al. |
| 7,872,218 B2 | 1/2011 | Endo et al. |
| 7,880,145 B2 | 2/2011 | Yagi et al. |
| 7,923,696 B2 | 4/2011 | Kameshima |
| 7,965,817 B2 | 6/2011 | Kameshima et al. |
| 7,989,772 B2 | 8/2011 | Yagi et al. |
| 8,093,562 B2 | 1/2012 | Yokoyama et al. |
| 8,107,588 B2 | 1/2012 | Kameshima et al. |
| 8,167,486 B2 | 5/2012 | Takenaka et al. |
| 8,218,070 B2 | 7/2012 | Kameshima |
| 8,222,611 B2 | 7/2012 | Yagi et al. |
| 8,247,779 B2 | 8/2012 | Kameshima et al. |
| 8,642,970 B2 | 2/2014 | Iwakiri et al. |
| 8,723,996 B2 | 5/2014 | Yokoyama et al. |
| 8,872,118 B2 | 10/2014 | Nishino et al. |
| 8,894,280 B2 | 11/2014 | Topfer et al. |
| 2003/0086523 A1 | 5/2003 | Tashiro et al. |
| 2005/0128327 A1 | 6/2005 | Bencuya et al. |
| 2008/0083876 A1 | 4/2008 | Endo et al. |
| 2009/0256079 A1 | 10/2009 | Endo et al. |
| 2009/0272909 A1 | 11/2009 | Takenaka et al. |
| 2010/0155576 A1 | 6/2010 | Merrill |
| 2010/0277623 A1 | 11/2010 | Tejada et al. |
| 2011/0032392 A1 | 2/2011 | Litvinov et al. |
| 2011/0309262 A1 | 12/2011 | Sato et al. |
| 2011/0317054 A1 | 12/2011 | Kameshima et al. |
| 2012/0132820 A1* | 5/2012 | Iwakiri et al. ........... 250/370.08 |
| 2012/0132824 A1 | 5/2012 | Nishino et al. |
| 2012/0132825 A1 | 5/2012 | Amitani et al. |
| 2013/0051525 A1 | 2/2013 | Sato |
| 2013/0140467 A1 | 6/2013 | Kitano et al. |
| 2013/0240712 A1 | 9/2013 | Takenaka et al. |
| 2013/0264488 A1 | 10/2013 | Sugawara et al. |
| 2013/0264490 A1 | 10/2013 | Takenaka et al. |
| 2014/0061491 A1 | 3/2014 | Iwashita et al. |
| 2014/0112448 A1 | 4/2014 | Takenaka et al. |
| 2014/0185764 A1 | 7/2014 | Takenaka et al. |
| 2014/0239186 A1 | 8/2014 | Sato et al. |
| 2014/0241501 A1 | 8/2014 | Sato et al. |
| 2014/0241502 A1 | 8/2014 | Kitano et al. |
| 2014/0241506 A1 | 8/2014 | Iwashita et al. |
| 2015/0085980 A1 | 3/2015 | Kitano et al. |

FOREIGN PATENT DOCUMENTS

| | | |
|---|---|---|
| JP | 2003-576 A | 1/2003 |
| JP | 2003-126072 A | 5/2003 |
| JP | 2004-130058 A | 4/2004 |
| JP | 2008-86000 A | 4/2008 |
| JP | 2009-219538 A | 10/2009 |
| JP | 2010-264085 A | 11/2010 |
| JP | 2010-268171 A | 11/2010 |
| JP | 2011-185622 A | 9/2011 |
| JP | 2012-129983 A | 7/2012 |
| JP | 2012-129984 A | 7/2012 |
| WO | 00/65825 A1 | 11/2000 |
| WO | 2010/150569 A1 | 12/2010 |
| WO | 2011/104991 A | 9/2011 |
| WO | 2012/008229 A1 | 1/2012 |

OTHER PUBLICATIONS

U.S. Appl. No. 14/211,970, filed Mar. 14, 2014, Takuya Ryu.
U.S. Appl. No. 14/290,479, filed May 29, 2014, Toshio Kameshima.
U.S. Appl. No. 14/292,230, filed May 30, 2014, Sho Sato.
U.S. Appl. No. 14/189,229, filed Feb. 25, 2014, Atsushi Iwashita.
U.S. Appl. No. 14/189,266, filed Feb. 25, 2014, Eriko Sato.
U.S. Appl. No. 14/189,249, filed Feb. 25, 2014, Eriko Sato.
Extended European Search Report in counterpart EP 14157069.7 dated Jun. 12, 2015 (8 pages).
Office Action dated Jun. 6, 2016, in counterpart Japanese patent application No. 2013-040031 (5 pages).

* cited by examiner

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

An radiation imaging apparatus performs an imaging operation in synchronism with radiation irradiation by a radiation generation apparatus. Japanese Patent Laid-Open No. 2010-264085 describes a radiation image capturing apparatus that detects radiation irradiation and starts accumulating charges in accordance with the detection. The radiation image capturing apparatus includes a plurality of radiation detection elements arrayed in a matrix, and a plurality of bias lines each connected to the radiation detection elements of a corresponding column. The plurality of bias lines are connected to a connection. The radiation image capturing apparatus includes a current detection means for detecting a current flowing to the connection, and a control means for judging exposure to radiation based on the current detected by the current detection means.

The output of the radiation detection element is decided by the product of the intensity and irradiation time of radiation to irradiate a subject. The radiation irradiation time generally falls within the range of 1 ms to several hundred ms. For example, a portable radiation generator or a radiation generator included in a cart for round visits tends to use a long irradiation time because the radiation output is weak. On the other hand, a stationary radiation generator tends to shorten the irradiation time to prevent image blurs caused by a subject motion. In a case in which radiation irradiation is detected using the integrated value of the bias current, when the integral interval is made long, the time required until detection of radiation irradiation becomes long. Hence, when a subject is irradiated with strong radiation for a short irradiation time, the time from the end of radiation irradiation to detection of radiation irradiation is long, and an artifact readily occurs in an image. On the other hand, with a short integral interval, detection of radiation irradiation may fail if the subject is irradiated with weak radiation for a long irradiation time.

SUMMARY OF THE INVENTION

The present invention provides a technique advantageous for detecting radiation irradiation at a high accuracy independently of the intensity of radiation to irradiate a subject.

The present invention in its first aspect provides a radiation imaging apparatus comprising: a pixel array in which a plurality of pixels configured to detect radiation are arrayed to form a plurality of rows and a plurality of columns; a detection circuit configured to detect information representative of a radiation dose to the pixel array and output a detection signal corresponding to the information; and a control unit configured to detect radiation irradiation of the pixel array based on a plurality of integrated values obtained by integrating either the detection signal or a result of processing applied to the detection signal, in a plurality of integral intervals and to control the pixel array in accordance with the detection.

The present invention in its second aspect provides a radiation imaging system comprising: a radiation imaging apparatus defined as the first aspect of the present invention; and a processor configured to process a signal output from the radiation imaging apparatus.

The present invention in its third aspect provides a method of controlling a pixel array comprising a plurality of pixels configured to detect radiation, the method comprising obtaining information from the pixel array representative of a radiation dose to the pixel array, integrating, over a plurality of integral intervals either the obtained information or a result of processing applied to the obtained information to obtain a plurality of integrated values, and controlling the pixel array in dependence upon the integrated values.

Further features of the present invention will become apparent from the following description of exemplary embodiments with reference to the attached drawings.

DESCRIPTION OF THE EMBODIMENTS

The present invention will now be described with reference to the accompanying drawings by way of exemplary embodiments.

First Embodiment

Figure 1:
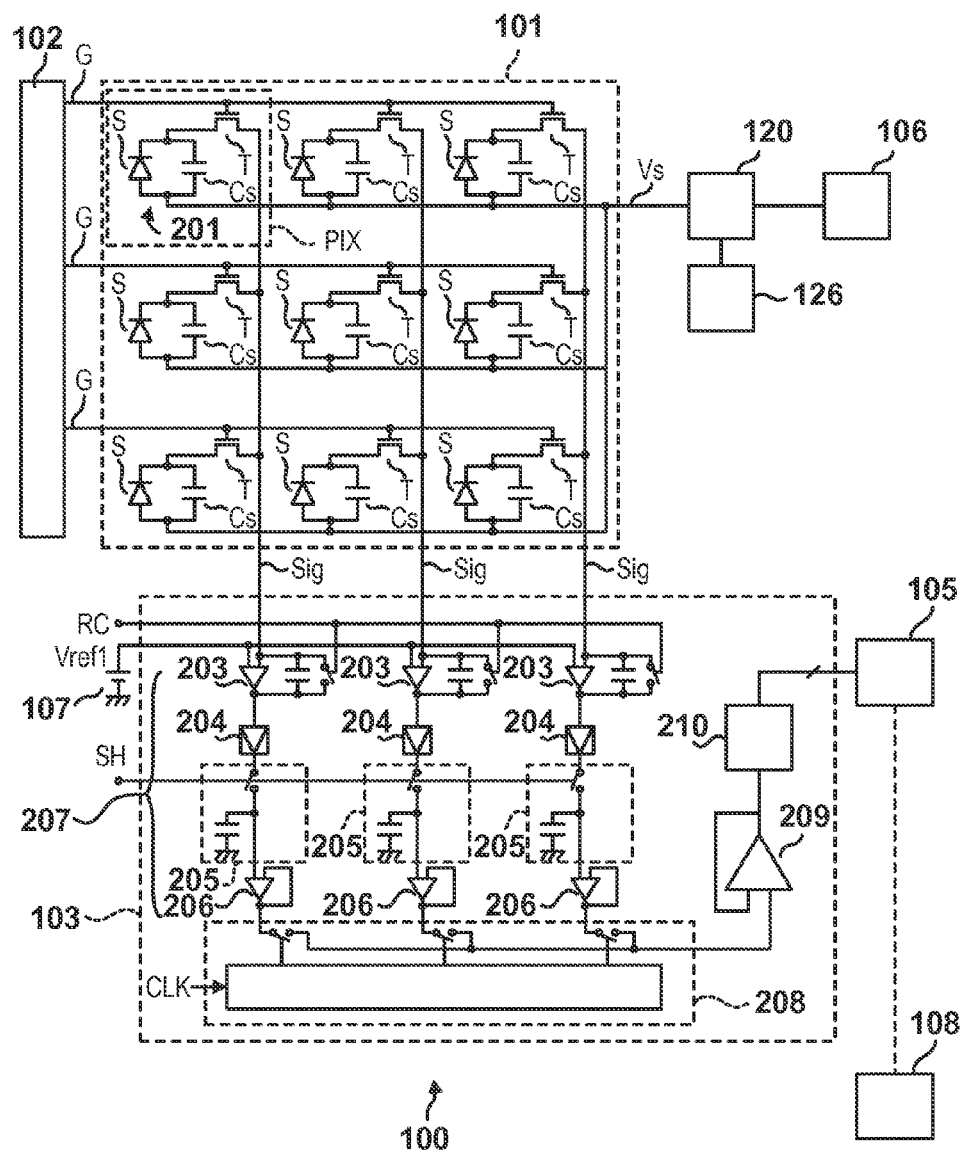
FIG. 1 is a block diagram for explaining the overall arrangement of a radiation imaging apparatus according to one embodiment of the present invention.

The overall arrangement of a radiation imaging apparatus 100 according to one embodiment of the present invention will be described with reference to FIG. 1. The radiation imaging apparatus 100 is configured to capture an image formed by radiation. The image can be formed by radiation emitted from a radiation source (not shown) and transmitted through a subject. The radiation can be, for example, X-rays, α-rays, β-rays, or γ-rays.

The radiation imaging apparatus 100 includes a pixel array 101, a driving circuit 102, a readout circuit 103, a detection circuit 120, a reference bias potential generation circuit 126, and a control unit 106. The radiation imaging apparatus 100 can also include a signal processing unit (processor) 105.

The pixel array 101 includes a plurality of pixels PIX two-dimensionally arrayed to form a plurality of rows and a plurality of columns. In the example shown in FIG. 1, the pixels PIX are arrayed to form 3 rows×3 columns. In fact, more pixels PIX are arrayed to form more rows and columns. Each pixel PIX includes a converter 201 that converts radiation or light into charges, and a switch element T that outputs an electrical signal corresponding to the charges to a signal line Sig, and is configured to detect radiation.

The converter 201 can be, for example, an indirect converter including a photoelectric converter S that converts light into charges, and a wavelength converter (scintillator) that converts radiation into light having a wavelength detectable by the photoelectric converter. Alternatively, the converter 201 can be a direct converter that directly converts radiation into charges. The photoelectric converter S can be, for example, a PIN photodiode mainly formed from amorphous silicon arranged on an insulating substrate such as a glass substrate. When the photoelectric converter of the converter 201 is a PIN photodiode, the converter 201 can have a capacitor Cs.

The switch element T can be a transistor having a control terminal and two primary terminals, for example, a thin film transistor (TFT). One electrode of the converter 201 is electrically connected to one electrode of the two primary terminals of the switch element T, and the other electrode of the converter 201 is electrically connected to a common bias line Vs. The detection circuit 120 supplies a bias potential VVs to the bias line Vs.

The gate of the switch element T is connected to a driving signal line G driven by the driving circuit 102. The driving circuit 102 drives the driving signal line G of a row to be selected in the pixel array 101 to the active level. When a signal of active level is supplied to the gate of the switch element T via the driving signal line G, the switch element T changes to the conductive state. Signals corresponding to the charges accumulated in the converters 201 of the pixels PIX of the selected row are thus parallelly output to the plurality of signal lines Sig.

The signals output to the signal lines Sig are read out by the readout circuit 103. The readout circuit 103 includes a plurality of amplifier circuits 207 and a multiplexer 208. The plurality of amplifier circuits 207 are provided such that one amplifier circuit 207 corresponds to one signal line Sig. The signals of the pixels PIX of the selected row which are parallelly output to the plurality of signal lines Sig are parallelly amplified by the plurality of amplifier circuits 207.

Each amplifier circuit 207 can include, for example, an integrating amplifier 203, a variable amplifier 204 that amplifies a signal from the integrating amplifier 203, a sample and hold circuit 205 that samples and holds the signal from the variable amplifier 204, and a buffer amplifier 206. The integrating amplifier 203 can include, for example, an operational amplifier that amplifies the difference between the signal output to the signal line Sig and a reference potential Vref1 from a reference power supply 107, an integral capacitor, and a reset switch. The integrating amplifier 203 can change the amplification factor by changing the value of the integral capacitor. The signal output to the signal line Sig is supplied to the inverting input terminal of the operational amplifier, and a reference voltage Vref from the reference power supply 107 is supplied to the non-inverting input terminal. The output terminal is connected to the input terminal of the variable amplifier 204. The integral capacitor and the reset switch are parallelly connected between the non-inverting input terminal and the output terminal of the operational amplifier. The sample and hold circuit 205 can be formed from, for example, a sampling switch and a sampling capacitor.

The multiplexer 208 sequentially selects and outputs the signals parallelly read out from the plurality of amplifier circuits 207 corresponding to the plurality of signal lines Sig, respectively. The readout circuit 103 can include a buffer amplifier 209 that buffers the signal from the multiplexer 208. The buffer amplifier 209 can function as an impedance converter. The readout circuit 103 can include an A/D converter 210. The A/D converter 210 can be arranged to, for example, convert the analog signal output from the buffer amplifier 209 into a digital signal.

The signal output from the readout circuit 103 can be provided to the signal processing unit 105. The signal processing unit 105 can be configured to process the signal output from the readout circuit 103 and supply it to a computer 108. The signal processing unit 105 can be either incorporated in the radiation imaging apparatus 100 or provided as an external device of the radiation imaging apparatus 100.

The control unit 106 generates a control signal for controlling the driving circuit 102, a control signal for controlling the readout circuit 103, and the like. The driving circuit 102 changes the switch element T of each pixel PIX of a row to read out signals to the conductive state in accordance with the control signal from the control unit 106. The control signal for controlling the readout circuit 103 can include, for example, a reset signal RC, a sample and hold signal SH, and a clock signal CLK. The reset signal RC controls the reset switch of the integrating amplifier 203. The sample and hold signal SH controls the sample and hold circuit 205. The clock signal CLK controls the multiplexer 208.

Figure 2:
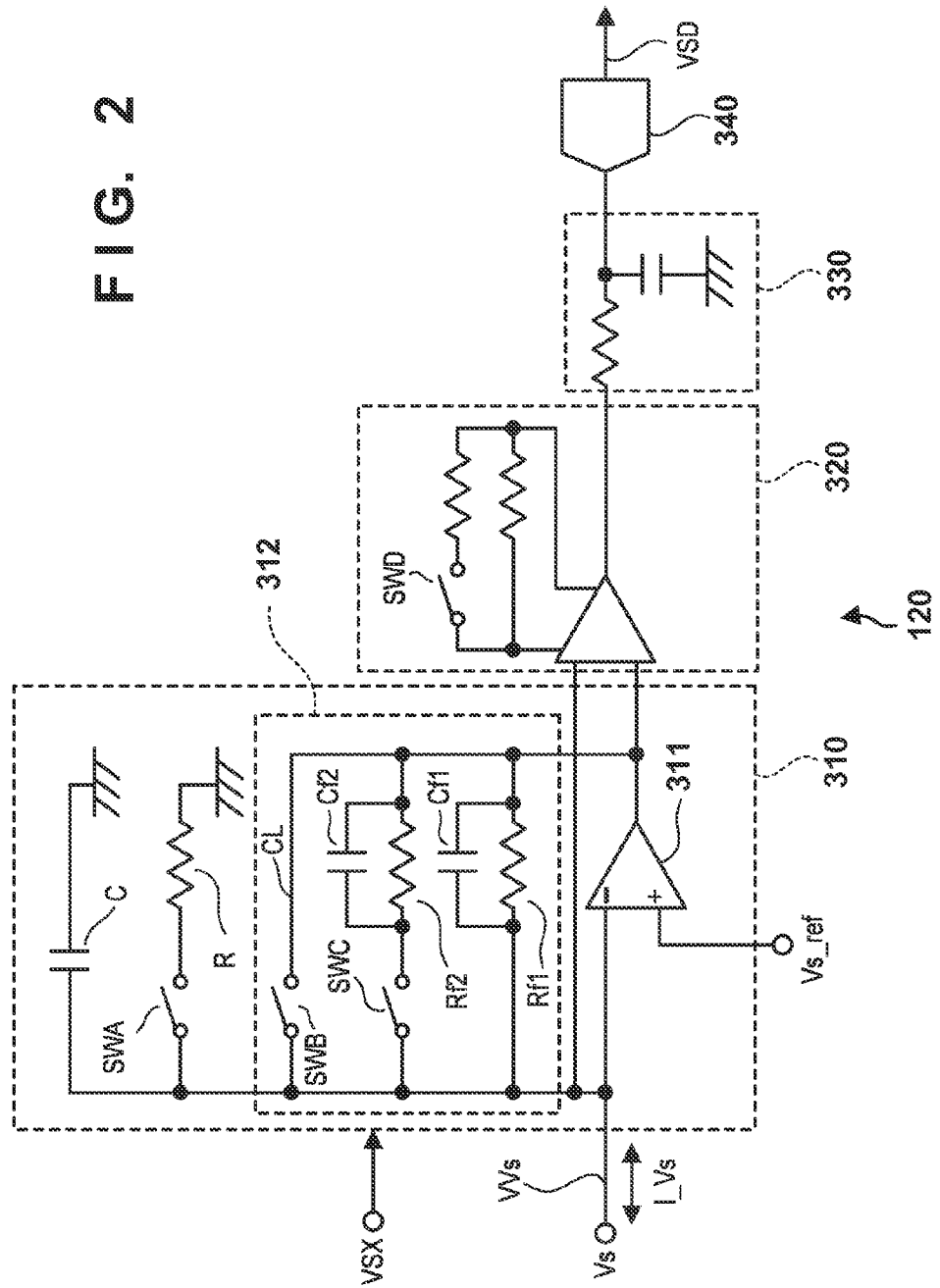
FIG. 2 is a circuit diagram showing a detection circuit.

The detection circuit 120 will be described below with reference to FIG. 2. The detection circuit 120 detects a current flowing to a bias line Vs, and provides a bias current signal VSD representing the current to the control unit 106. The detection circuit 120 can include, for example, a current-voltage conversion amplifier 310, a voltage amplifier 320, a filter circuit 330, and an A/D converter 340. The current-voltage conversion amplifier 310 converts the current flowing to the bias line Vs into a voltage. The voltage amplifier 320 amplifies the signal (voltage signal) output from the current-voltage conversion amplifier 310. The voltage amplifier 320 can be formed from, for example, an instrumentation amplifier. The filter circuit 330 is a filter that limits the band of the signal output from the voltage amplifier 320, and can be, for example, a low-pass filter. The A/D converter 340 supplies, to the control unit 106, the bias current signal VSD that is a digital signal converted from the signal (analog signal) output from the filter circuit 330.

The detection circuit 120 or the current-voltage conversion amplifier 310 not only detects the current flowing to the bias line Vs but also supplies a potential corresponding to a reference bias potential Vs_ref given by the reference bias potential generation circuit 126 to the bias line Vs. The current-voltage conversion amplifier 310 can be a transimpedance amplifier. The current-voltage conversion amplifier 310 includes, for example, an operational amplifier 311, and a feedback path 312 arranged between the inverting input terminal (second input terminal) and the output terminal of the operational amplifier 311. The reference bias potential Vs_ref is given to the non-inverting input terminal (first input terminal) of the operational amplifier 311. The feedback path can include, for example, a first path that shorts the inverting input terminal and the output terminal of the operational amplifier 311 by a resistor Rf1, a second path that shorts the inverting input terminal and the output terminal by a resistor Rf2, and a third path that shorts the inverting input terminal and the output terminal by an electrically conductive line CL.

A phase compensation capacitor Cf1 can be connected in parallel to the resistor Rf1. A phase compensation capacitor Cf2 can be connected in parallel to the resistor Rf2. The phase compensation capacitors Cf1 and Cf2 effectively prevent, for example, the current-voltage conversion amplifier 310 from oscillating. A switch SWC can be arranged in series in the path including the resistor Rf2. A switch SWB can be arranged in series in the path formed from the electrically conductive line CL.

The control unit 106 supplies a control signal VSX to the detection circuit 120 and selects a path to be enabled out of the plurality of paths including the first path, the second path, and the third path, thereby controlling the feedback impedance. When the switch SWB is closed, the third path formed from the electrically conductive line CL is enabled, and the first path including the resistor Rf1 and the second path including the resistor Rf2 are disabled. When the switch SWB is opened, and the switch SWC is closed, the third path is disabled, and the first path and the second path are enabled. When the switch SWB and the switch SWC are opened, the second path and the third path are disabled, and the first path is enabled.

A switch SWA and a resistor R may be arranged in series between the ground and the inverting input terminal of the operational amplifier 311. A capacitor C may be arranged between ground and the inverting input terminal of the operational amplifier 311.

The current-voltage conversion amplifier 310 includes the feedback path 312 and thus functions to generate, in the inverting input terminal (second input terminal), a potential corresponding to the reference bias potential Vs_ref given to the non-inverting input terminal (first input terminal) of the operational amplifier 311. More specifically, the current-voltage conversion amplifier 310 functions to generate, in the inverting input terminal, a potential almost equal to the reference bias potential Vs_ref given to the non-inverting input terminal of a differential amplifier circuit 311. In this case, the control unit 106 controls the impedance (to be referred to as a feedback impedance hereinafter) of the feedback path 312 of the current-voltage conversion amplifier 310.

A large feedback impedance means that the gain of the current-voltage conversion amplifier 310 is large. On the other hand, when the feedback impedance is large, the magnitude of a bias current I_Vs is limited by this, and the potential of the bias line Vs can be unstable. Hence, the feedback impedance is preferably controlled in accordance with the operation of the radiation imaging apparatus 100, for example, a detection operation of detecting radiation irradiation to the pixel array 101 or a readout operation of signals from the pixels PIX. This will be described below in more detail.

In this embodiment, the control unit 106 detects the start of radiation irradiation to the pixel array 101 based on the output from the detection circuit 120, that is, the bias current signal VSD, and controls a charge accumulation operation by the plurality of pixels PIX in accordance with the detection. That is, to quickly detect the start of radiation irradiation to the pixel array 101, the detection circuit 120 needs to detect the current flowing to the bias line Vs at a high sensitivity. Hence, in the detection operation of detecting radiation irradiation to the pixel array 101, the feedback impedance is preferably large.

On the other hand, when transferring the charges accumulated in the capacitor Cs of the converter 201 to the signal line Sig via the switch element T, if the feedback impedance is large, current supply from the bias line Vs to the side of a second electrode s2 of the converter 201 delays. In particular, when strong radiation partially strikes the pixel array 101, noise readily occurs in a captured image due to the delay of current supply from the bias line Vs to the side of the second electrode s2 of the converter 201. Hence, when transferring the charges accumulated in the capacitor Cs of the converter 201 to the signal line Sig via the switch element T, the feedback impedance is preferably made small.

The control unit 106 controls the feedback impedance such that the feedback impedance in the detection operation of detecting radiation irradiation becomes larger than that in the readout operation of signals from the pixels PIX.

The control unit 106, for example, opens the switch SWB in the detection operation of detecting radiation irradiation, and closes the switch SWB in the readout operation of signals from the pixels PIX. In this case, the switch SWC can be either opened or closed in both the detection operation of detecting radiation irradiation and the readout operation of signals from the pixels PIX.

Alternatively, the control unit 106 opens the switch SWB and closes the switch SWC in the detection operation of detecting radiation irradiation, and closes the switch SWB in the readout operation of signals from the pixels PIX (the switch SWC can be either opened or closed because the switch SWB is closed).

The switch SWA and the resistor R are not indispensable. However, when the switch SWA and the resistor R are provided, the switch SWA can be closed during the inoperative period of the detection circuit 120, and opened in the detection operation of detecting radiation irradiation. The switch SWA can be either closed or opened in the readout operation of signals from the pixels PIX.

The voltage amplifier 320 can be formed as an amplifier having a variable gain. For example, the gain of the voltage amplifier 320 can be changed by closing or opening a switch SWD.

The operation of the radiation imaging apparatus 100 includes an initialization operation, an accumulation operation, and the readout operation. The initialization operation is an operation of initializing the plurality of pixels PIX of the pixel array 101 in units of at least one row. For example, the plurality of pixels PIX of the pixel array 101 are initialized in units of one row. The accumulation operation is an operation of accumulating charges generated by radiation irradiation in each pixel PIX of the pixel array 101. The readout operation is an operation of reading out, from the pixel array 101, a signal corresponding to the charges accumulated in each pixel PIX of the pixel array 101 by radiation irradiation to the pixel array 101 and outputting an image (image signal).

A shift from the initialization operation to the accumulation operation occurs when the control unit 106 detects the start of radiation irradiation to the radiation imaging apparatus 100 based on the output from the detection circuit 120. A shift from the accumulation operation to the readout operation occurs in accordance with, for example, the elapse of a predetermined time from the start of the accumulation operation.

Figure 3:
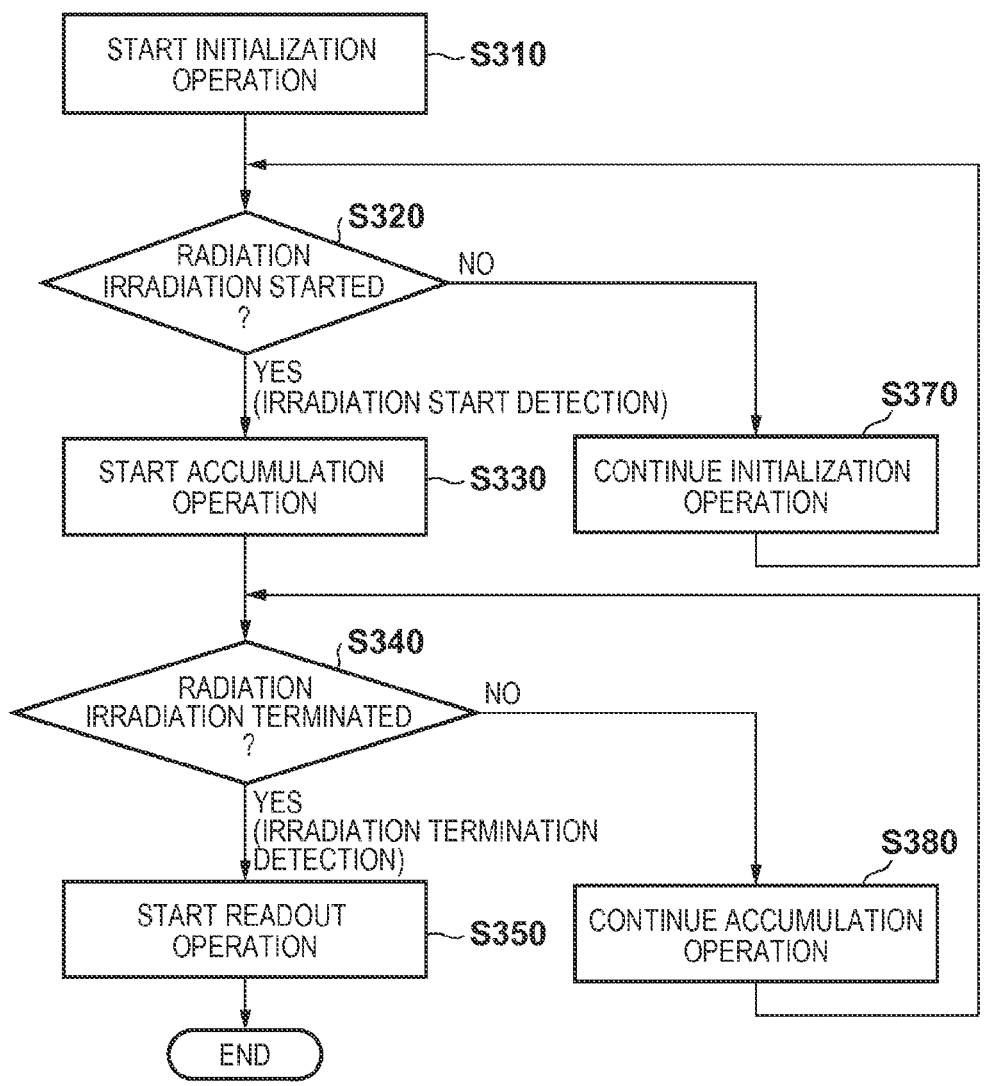
FIG. 3 is a flowchart for explaining the operation of the radiation imaging apparatus according to one embodiment of the present invention.
Figure 4:
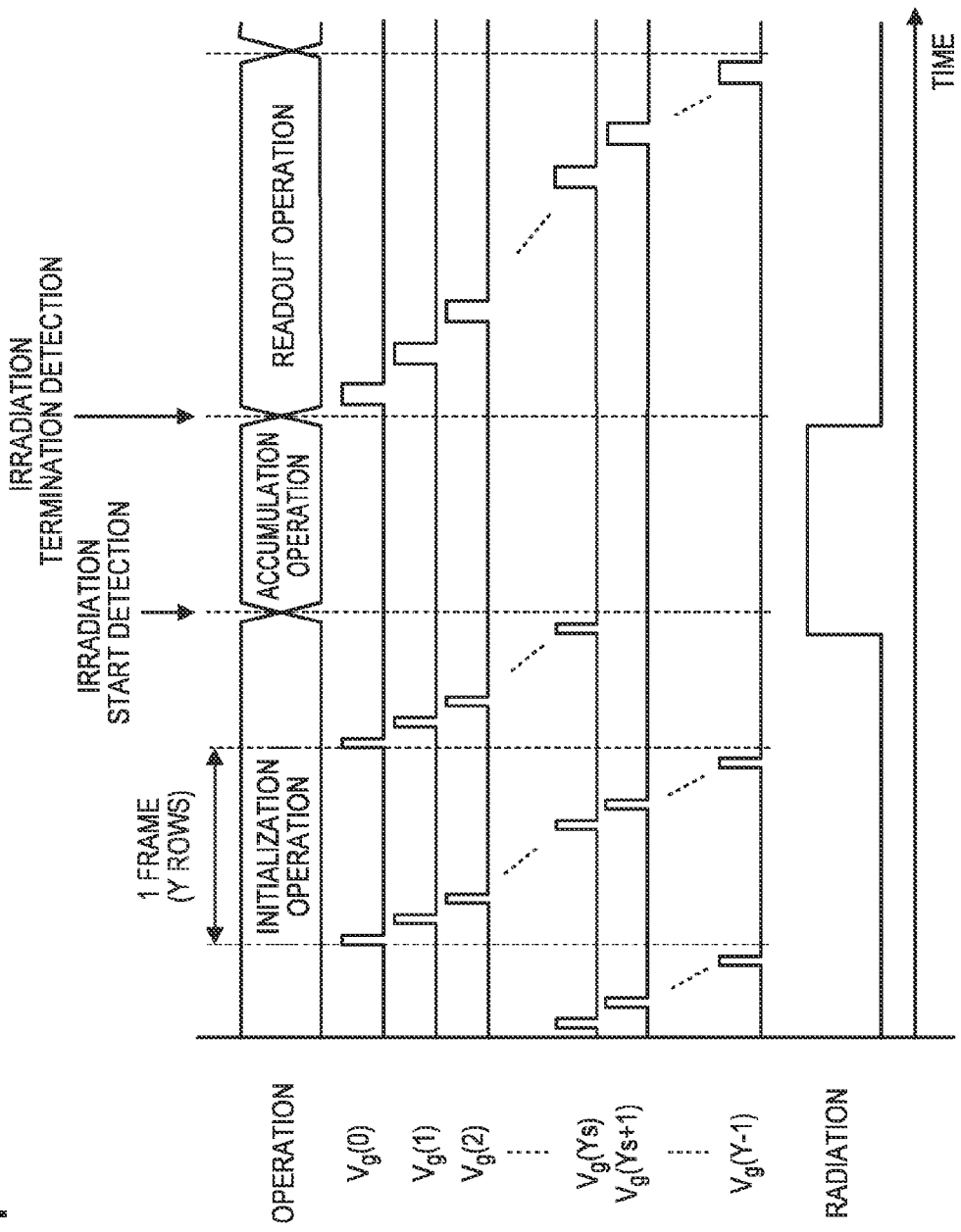
FIG. 4 is a timing chart for explaining the operation of the radiation imaging apparatus according to one embodiment of the present invention.

The operation of the radiation imaging apparatus 100 will be described with reference to FIGS. 3 and 4. In step S310, the control unit 106 starts the initialization operation. In the initialization operation, the control unit 106 repeats an operation of sequentially setting the driving signal lines G of the first to last rows to the active level and setting the reset signal RC to the active level. When the reset signal RC changes to the active level, the integrating amplifiers 203 are set in a voltage follower state, and the reference potential Vref1 is supplied to the signal lines Sig. In this state, the switches T of the row whose driving signal line G is set to the active level change to the conductive state, and charges accumulated in the capacitors Cs of the converters 201 are initialized. Referring to FIG. 4, Vg(0), Vg(1), Vg(2), . . . , Vg(Ys), Vg(Ys+1), . . . , Vg(Y−1) represent driving signals supplied to the driving signal lines G of the first to last rows of the pixel array 101.

During the period of the initialization operation, the detection circuit 120 detects information having correlation to the radiation dose to the pixel array 101, and supplies a detection signal corresponding to the information to the control unit 106. In this embodiment, the detection circuit 120 detects the current I_Vs flowing to the bias line Vs as the information having correlation to the radiation dose to the pixel array 101, and supplies the bias current signal VSD representing the current to the control unit 106 as the detection signal corresponding to the information.

During the initialization operation, in step S320, the control unit 106 performs radiation detection processing. More specifically, the control unit 106 determines the start of radiation irradiation to the pixel array 101 based on the bias current signal VSD. The control unit 106 can detect the start of radiation irradiation to the pixel array 101 based on, for example, the integrated value of the bias current signal VSD. The control unit 106 sets the feedback impedance in the detection operation of detecting radiation irradiation to be larger than that in the readout operation of signals from the pixels PIX.

The control unit 106 continues the initialization operation until the start of radiation irradiation to the pixel array 101 is detected (step S370). Upon detecting the start of radiation irradiation to the pixel array 101 (YES in step S320), the control unit 106 starts the accumulation operation in step S330. That is, when the start of radiation irradiation is detected (illustrated as "irradiation start detection" in FIG. 4), a shift from the initialization operation to the accumulation operation occurs. The detection processing in step S320 will be described later with reference to FIG. 7.

During the accumulation operation, in step S340, the control unit 106 determines the end of radiation irradiation. The radiation irradiation end determination method is not particularly limited. For example, radiation irradiation can be determined as ended in accordance with the elapse of a predetermined time from the start of the accumulation operation. Alternatively, the control unit 106 can detect the end of radiation irradiation to the pixel array 101 based on at least one of the instantaneous value, integrated value, and differential value of the bias current signal VSD.

The control unit 106 continues the accumulation operation until it determines that the radiation irradiation to the pixel array 101 has ended (step S380). Upon determining that the radiation irradiation to the pixel array 101 has ended (YES in step S340), the control unit 106 starts the readout operation in step S350. That is, when it is determined that the radiation irradiation has ended (illustrated as "irradiation end detection" in FIG. 4), a shift from the accumulation operation to the readout operation occurs. In the readout operation, signals are sequentially read out from the pixels of the first row to those of the last row of the pixel array 101.

Figure 5:
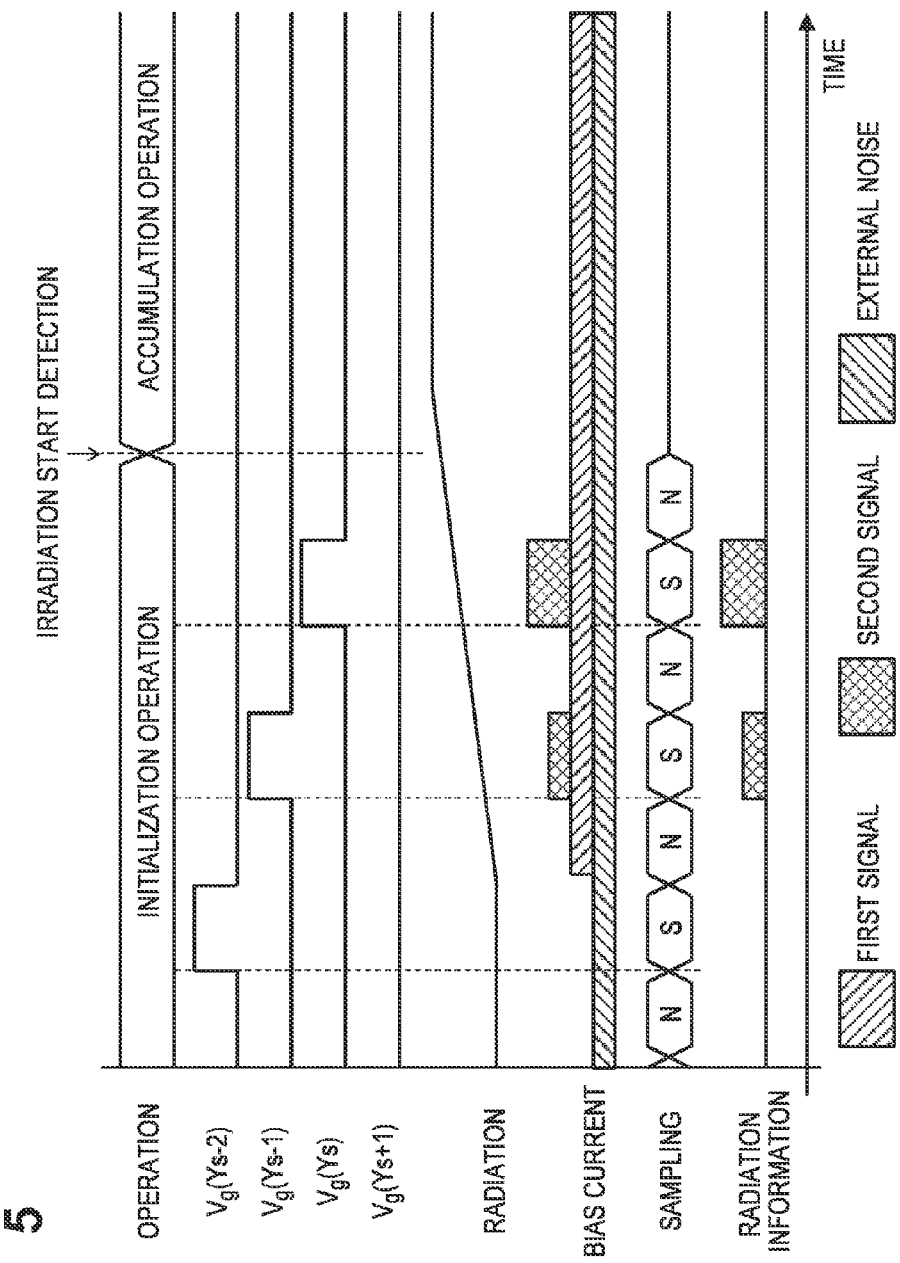
FIG. 5 is a timing chart showing the operations of the detection circuit and a control unit associated with detection of radiation irradiation.

FIG. 5 illustrates the operations of the detection circuit 120 and the control unit 106 associated with detection of radiation irradiation. Referring to FIG. 5, Vg(Ys−2), Vg(Ys−1), Vg(Ys), and Vg(Ys+1) represent driving signals supplied to the driving signal lines G of the (Ys−2)th to the (Ys+1)th rows of the pixel array 101.

Concerning the current flowing to the bias line Vs, the radiation imaging apparatus 100 can have the following features.

(1) During radiation irradiation, a current proportional to the radiation dose per unit time flows to the bias line Vs independently of the conductive/nonconductive state of the switch element T of the pixel PIX. This current is illustrated as a "first signal" in FIG. 5.

(2) When the switch element T of the pixel PIX irradiated with radiation is changed to a conductive state, a current proportional to the amount of charges, which have been accumulated in the converter 201 of the pixel PIX until the switch element T is changed to the conductive state, flows to the bias line Vs. This current is illustrated as a "second signal" in FIG. 5.

(3) When the conductive/nonconductive state of the switch element T of the pixel PIX is switched, a current flows to the bias line Vs. This current can be called switching noise.

(4) When a shock or a magnetic field is applied to the radiation imaging apparatus 100, a current flows to the bias line Vs. This current can be called external noise, and is illustrated as "external noise" in FIG. 5.

(5) Even without application of a shock or a magnetic field to the radiation imaging apparatus 100, a current flows to the bias line Vs due to an electromagnetic wave generated by the radiation imaging apparatus 100 itself or the internal noise of the detection circuit 120. This current can be called system noise.

To detect radiation irradiation and, more specifically, the start of radiation irradiation, the sampling value of the bias current signal VSD as a detection signal may directly be used. However, if external noise generated by the influence of a shock or a magnetic field cannot be neglected, radiation irradiation is preferably detected based on a result (this will be referred to as radiation information) derived by processing of the bias current signal VSD.

As shown in FIG. 5, a bias current flowing to the bias line Vs when the switch element T of the pixel PIX is set in the conductive state is sampled as S. In addition, a bias current flowing to the bias line Vs when the switch element T of the pixel PIX is set in the nonconductive state is sampled as N. By calculating the difference between S and N, the external noise can be removed. However, the external noise varies along with the elapse of time, S and N which are sampled at times close to each other are preferably used. More specifically, let S(y) be S sampled for the yth time, N(y) be N sampled for the yth time, and X(y) be the sample value (radiation information) obtained by removing external noise. In this case, X(y) can be obtained by $$X(y)=S(y)-\{N(y)+N(y-1)\}/2 \quad (1)$$

Equation (1) indicates calculation of the difference between the bias current signal VSD (detection signal) when the switch element T is in the conductive state and the bias current signal VSD (detection signal) when the switch element T is in the nonconductive state.

The method of reducing external noise in the above-described way will be referred to as CDS (Correlated Double Sampling) in this specification. The calculation of CDS is not limited to the calculation method of equation (1). For example, to calculate X(y), one of N(y) and N(y−1) may be used, or a sample value such as S(y−1) or N(y−2) that is not adjacent may be used. Alternatively, S may be sampled a plurality of times during the period, and the sampled values may be added to obtain S(y) sampled for the yth time.

Figure 6:
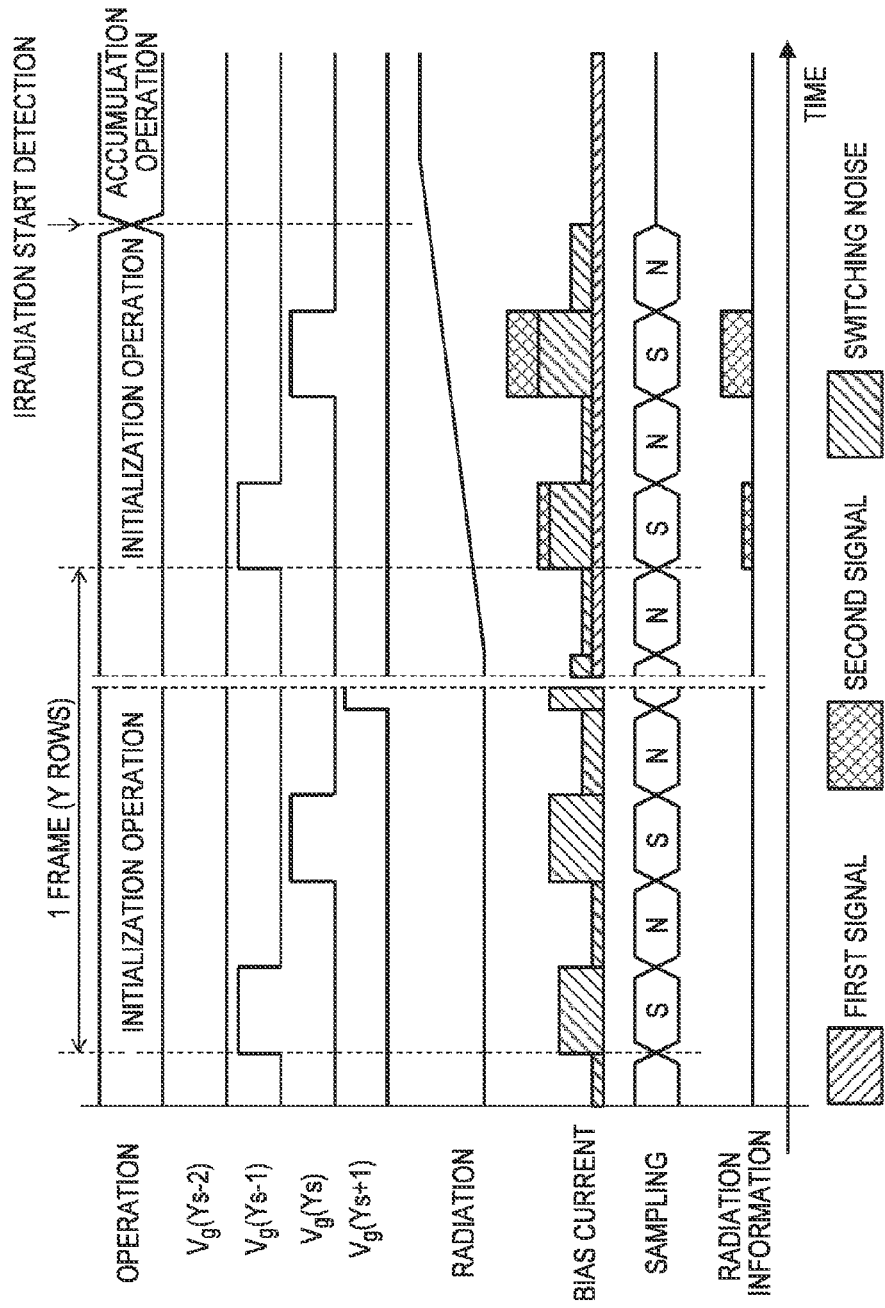
FIG. 6 is a timing chart showing the operations of the detection circuit and the control unit associated with detection of radiation irradiation.

As shown in FIG. 6, switching noise generated when switching the conductive/nonconductive state of the switch element T cannot be neglected in some cases. In such a case, (the start of) radiation irradiation is preferably detected based on the result (radiation information) of processing of the bias current signal VSD to reduce the switching noise. An example of the processing of reducing the switching noise is processing of subtracting the value of switching noise sampled in advance from the value of the bias current signal VSD.

The magnitude of switching noise can change between rows. It has been confirmed that the magnitude of switching noise is reproducible in a single row. Hence, as shown in FIG. 6, the switching noise can effectively be reduced by subtracting the bias current value of the immediately preceding frame from the bias current value of the same row. When the number of rows of the pixel array 101 is Y, S of the immediately preceding frame is S(y−Y), and N of the immediately preceding frame is N(y−Y). Hence, X(y) is obtained by $$X(y)=[S(y)-\{N(y)+N(y-1)\}/2]-[S(y-Y)-\{N(y-Y)+N(y-1-Y)\}/2] \quad (2)$$

The first term of equation (2) means that the difference between the bias current signal VSD (detection signal) when the switch element T is in the conductive state and the bias current signal VSD (detection signal) when the switch element T is in the nonconductive state is calculated for the yth row.

The second term of equation (2) means that the difference between the bias current signal VSD (detection signal) when the switch element T is in the conductive state and the bias current signal VSD (detection signal) when the switch element T is in the nonconductive state is calculated for the yth row of the immediately preceding frame. Equation (2) as a whole means that the difference between the latest difference and the immediately preceding difference for the same row is obtained.

The method of reducing switching noise in the above-described way can be referred to as frame correction. The calculation of frame correction is not limited to the calculation method of equation (2). For example, S and N of the frame preceding by k frames may be used (k>1). The calculation may be done using only S or N. Note that when CDS is unnecessary, frame correction is performed without CDS.

Radiation detection processing in step S320 of FIG. 4 will be described below in more detail with reference to FIG. 7. The control unit 106 detects (the start of) radiation irradiation by integrating the bias current signal VSD or the result (radiation information) of processing of the bias current signal VSD (for example, the result of amplifying the bias current signal VSD). In this case, the control unit 106 detects (the start of) radiation irradiation by integrating X[n] that is the result (radiation information) of processing of the bias current signal VSD. X[n] indicates nth radiation information sampled previously. That is, X[0] is the latest radiation information. The larger n is, the earlier the radiation information was obtained in the past.

In step S710, the control unit 106 gives initial values to an integrated value Sum, an radiation information index n, and an integral interval identification number m (m is a natural number). The initial values are Sum=0, n=0, and m=1. This will be referred to as reset of the integrator.

In step S720, the control unit 106 sets a value obtained by adding the integrated value Sum and the nth radiation information X[n] sampled previously as the new integrated value Sum. That is, Sum=Sum+X[n]. In step S730, the control unit 106 executes n=n+1. In step S740, the control unit 106 performs interval determination. In the interval determination of step S740, if n does not exceed the mth integral interval W[m] designated in advance (NO), the process returns to step S720 to continue integration (cumulative addition). On the other hand, if n exceeds W[m] (YES), the process advances to step S750 to perform irradiation start determination.

In irradiation start determination of step S750, if the integrated value Sum exceeds a predetermined threshold value T[m] of the mth integral interval (YES), the control unit 106 determines that radiation irradiation has started. That is, the control unit 106 detects the start of radiation irradiation by comparing the integrated value Sum and the threshold value T[m] of the mth integral interval. The determination in step S320 of FIG. 3 thus ends with "YES". On the other hand, if the integrated value Sum does not exceed the threshold value T[m] of the mth integral interval (NO), the control unit 106 executes m=m+1 in step S760 and performs termination determination in step S770.

In the termination determination of step S770, if m does not exceed the number M of integral intervals (NO), the control unit 106 returns to step S720 to continue integration (cumulative addition). On the other hand, in the termination determination of step S770, if m exceeds the number M of integral intervals (YES), the control unit 106 determines that radiation irradiation is not being performed. The determination in step S320 of FIG. 3 thus ends with "NO".

Figure 7:
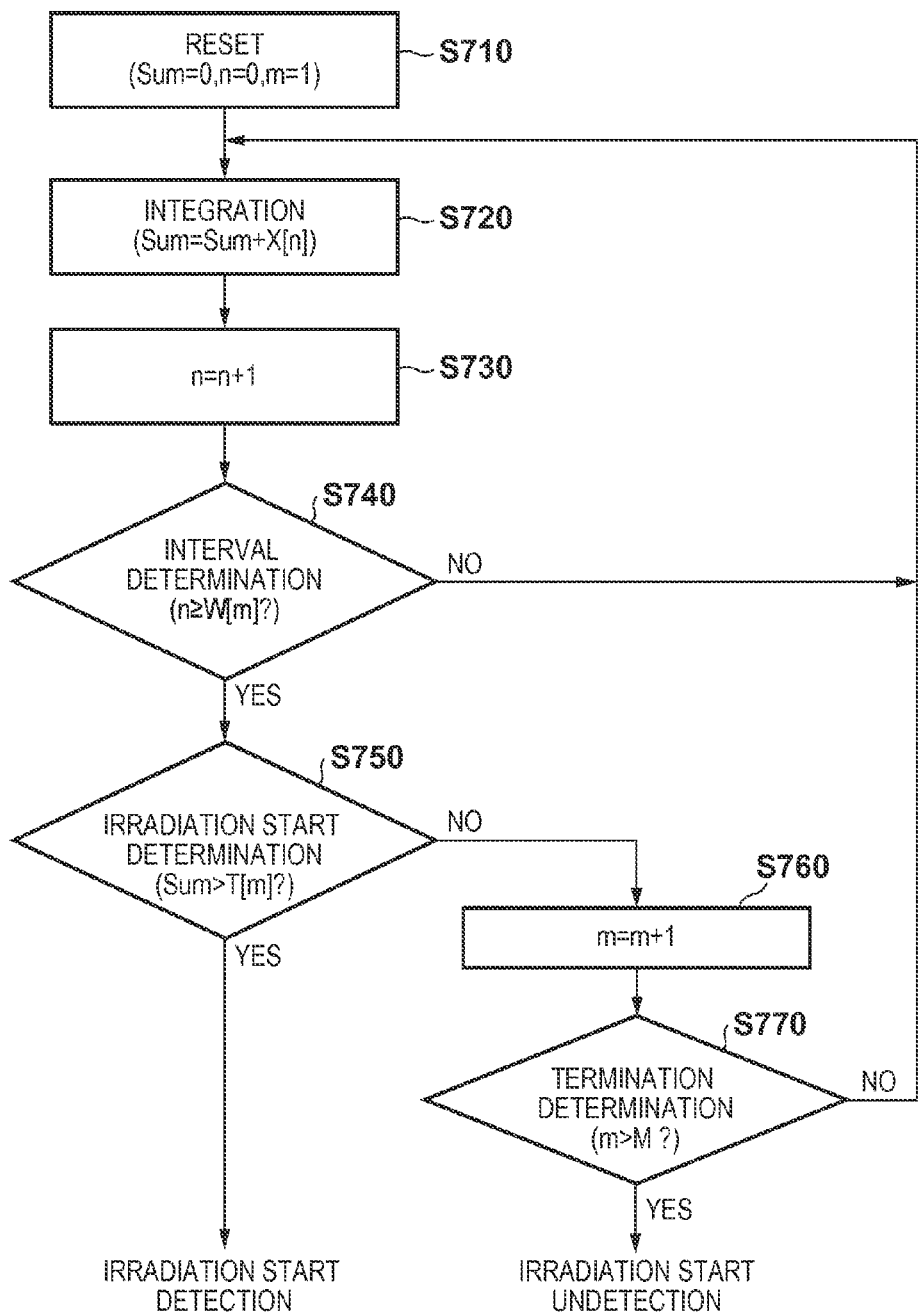
FIG. 7 is a flowchart for explaining the operation (step S320 of FIG. 4) of the radiation imaging apparatus according to one embodiment of the present invention.
Figure 8:
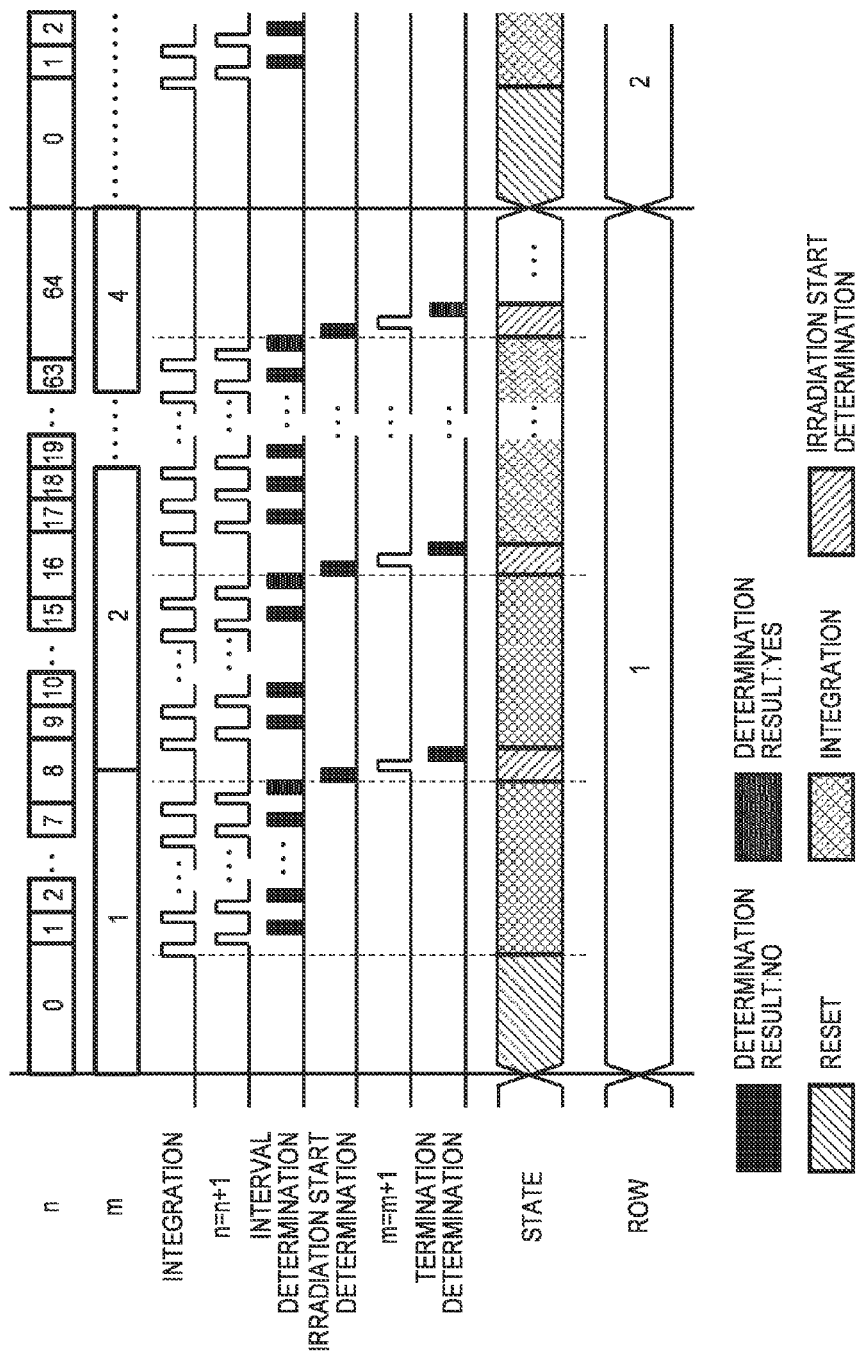
FIG. 8 is a timing chart showing an example of execution of processing shown in FIG. 7.

FIG. 8 shows an example of execution of the processing shown in FIG. 7. Note that for the sake of simplicity, the number M of integral intervals is set to 4, the first integral interval W[1]=8, the second integral interval W[2]=16, the third integral interval W[3]=32, and the fourth integral interval W[4]=64. Also assume that the integrated value Sum does not exceed the threshold value T[m] in all integral intervals m.

As shown in FIG. 7, first, initial values are given to the integrated value Sum, the index n, and the integral interval number m. The initial values are Sum=0, n=0, and m=1. Next, a value obtained by adding the integrated value Sum and the radiation information X[0] is set as the new integrated value Sum. That is, Sum=Sum+X[0]. After such integration (cumulative addition), n=n+1 is executed, and interval determination is performed. After the first cumulative addition, n is 1. For this reason, n does not exceed the first integral interval W[1]=8. That is, the interval determination ends with "NO". Hence, cumulative addition for integration is performed. When cumulative addition for integration is repeated eight times, the integrated value Sum equals a value obtained by integrating eight pieces of radiation information X[0] to X[7]. Additionally, since n=8, n exceeds the first integral interval W[1]=8. That is, since the interval determination ends with "YES", irradiation start determination is performed. In the irradiation start determination, since the integrated value Sum does not exceed the predetermined threshold value T[1] of the first integral interval, m=m+1 is executed, and termination determination is then performed. After the first irradiation start determination, m is 1. For this reason, m does not exceed the number M of integral intervals=4. That is, since the termination determination ends with "NO", cumulative addition is performed again for integration. When cumulative addition for integration is repeated 64 times, detection determination in the first to fourth integral intervals is performed, and the integral interval number m=4. Hence, the termination determination ends with "YES", and step S320 of FIG. 3 ends with "NO".

The above-described detection determination (step S320) can be done every time the bias current signal VSD is newly sampled, and the radiation information X is newly generated. For example, the detection determination (step S320) can be executed every time the initialization operation of one row is executed.

As is apparent from the above explanation, the control unit 106 detects radiation irradiation to the pixel array 101 based on a plurality of integrated values obtained by integrating the detection signal (VSD) or the result (X) of processing of the detection signal in the plurality of integral intervals W[1] to W[M]. In accordance with the detection, the control unit 106 controls the pixel array 101 (for example, shift from the initialization operation to the accumulation operation).

Radiation irradiation is detected by the above-described method. Hence, when performing strong radiation irradiation for a short irradiation time, the radiation irradiation is immediately detected by the irradiation start determination (step S750) after a short integral interval. When performing weak radiation irradiation for a long irradiation time, the radiation irradiation is reliably detected by integration in a long integral interval. It is therefore possible to detect radiation to irradiate a subject for various irradiation times.

The threshold values T[1] to T[M] may be identical (predetermined value). However, the bias current signal VSD or the radiation information X that is the result of processing applied to the signal includes noise. As the integral interval becomes long, the noise amount increases, and a detection error readily occurs. Hence, a unique threshold value is preferably set for each integral interval. For example, assume that when noise included in the bias current signal VSD or the radiation information X that is the result of processing applied to the signal is white noise, and the length of a given integral interval is $W_1$, the standard deviation of noise included in the integrated value Sum is $N_1$. At this time, the standard deviation of noise included in the integrated value Sum when the integral interval is multiplied by k is $\sqrt{k}$ times of $N_1$. Hence, when the length of the integral interval is $W_1*k$, the threshold value is preferably set to $W_1*\sqrt{k}$.

Information used for irradiation start determination can be either the bias current signal VSD or the radiation information X that is the result of processing applied to the signal. It is more advantageous to use the radiation information X obtained by performing CDS and frame correction processing for the bias current signal VSD and reducing noise. In this case, system nose is dominant in the noise components included in the X-ray information. The system noise can be regarded as white noise. For this reason, when the length of the integral interval is multiplied by k, the threshold value is preferably multiplied by $\sqrt{k}$.

Next, the number of integral intervals and their length will be examined. In general, the larger the number M of integral intervals, the wider the compatible irradiation time range is. However, if M is too large, implementation is difficult. To decrease M without narrowing the compatible irradiation time, the relation between adjacent integral intervals needs to be optimized. The present inventor found by mathematical examinations that the integral interval length is preferably given by a geometric series. That is, the length W[m+1] of the (m+1)th integral interval preferably complies with $$W[m+1]=k*W[m] (k>1) \qquad (3)$$

k is a real number larger than 1, and is preferably an integer from the viewpoint of hardware implementation. Considering the relation to the threshold value, implementation is easy when k=4. In this case, the length W[m+1] of the (m+1)th integral interval and the (m+1)th threshold value T[m+1] preferably comply with $$W[m+1]=4*W[m]$$

$$T[m+1]=\sqrt{4}*T[m]=2T[m] \qquad (4)$$

In the above-described embodiment, the calculations for CDS and frame correction are performed before the calculation for integration. However, the order of the calculations for CDS, frame correction, and integration can arbitrarily be determined. For example, the calculations for CDS and frame correction may be performed after the calculation for integration.

In the above-described embodiment, all pixels PIX are connected to the common bias line Vs. However, a plurality of independent bias lines may be provided. In this case, as information indicative of the radiation dose to the pixel array 101, a current flowing to some or all of the plurality of bias lines can be used.

In the above-described embodiment, as information indicative, or representative, of the radiation dose to the pixel array 101, the current I_Vs flowing to the bias line Vs is used. However, for example, a current flowing to the driving circuit 102 and/or the readout circuit 103 may be used as the information representative of the radiation dose to the pixel array 101. Alternatively, a current flowing to the signal line Sig of the pixel array 101 may be used as the information representative of the radiation dose to the pixel array 101.

The physical quantity representative of the radiation dose to the pixel array 101 is not limited to a current and may be, for example, a voltage or charges. A current, charges, and a voltage may be mixed.

In the above-described embodiment, when the integrated value exceeds the threshold value in one of the plurality of integral intervals, it is determined that radiation irradiation has started. However, it may be determined that radiation irradiation has started when each of a predetermined number of integrated values including at least two of the plurality of integrated values exceeds a corresponding threshold value.

The control unit 106 may be configured to change the operation of the detection circuit 120 in accordance with the integral interval associated with the integrated value that exceeds the corresponding threshold value out of the plurality of integrated values. The control unit 106 can be configured to, for example, change the gain of the detection circuit 120 in accordance with the integral interval associated with the integrated value that exceeds the corresponding threshold value out of the plurality of integrated values. This can optimize the detection processing for subsequent imaging.

The control unit 106 may be configured to output information representing the integral interval associated with the integrated value that exceeds the corresponding threshold value out of the plurality of integrated values. This information can be used by the computer 108. Based on this information, the computer 108 can, for example, change a parameter used to process the image output from the radiation imaging apparatus 100 (for example, a parameter for processing of reducing noise).

Second Embodiment

The second embodiment of the present invention will be described below. For matters not mentioned in the second embodiment, the first embodiment, the first embodiment can apply equally. The radiation imaging apparatus 100 according to the first embodiment can typically be configured to perform detection processing during the initialization operation of one row. However, when the integral interval W[m] is long, the number of times of cumulative addition increases. This prolongs the time necessary for detection processing, and an artifact may occur in a captured image. The second embodiment provides a technique advantageous for shortening the time necessary for detection processing even when the integral interval is long.

Figure 9:
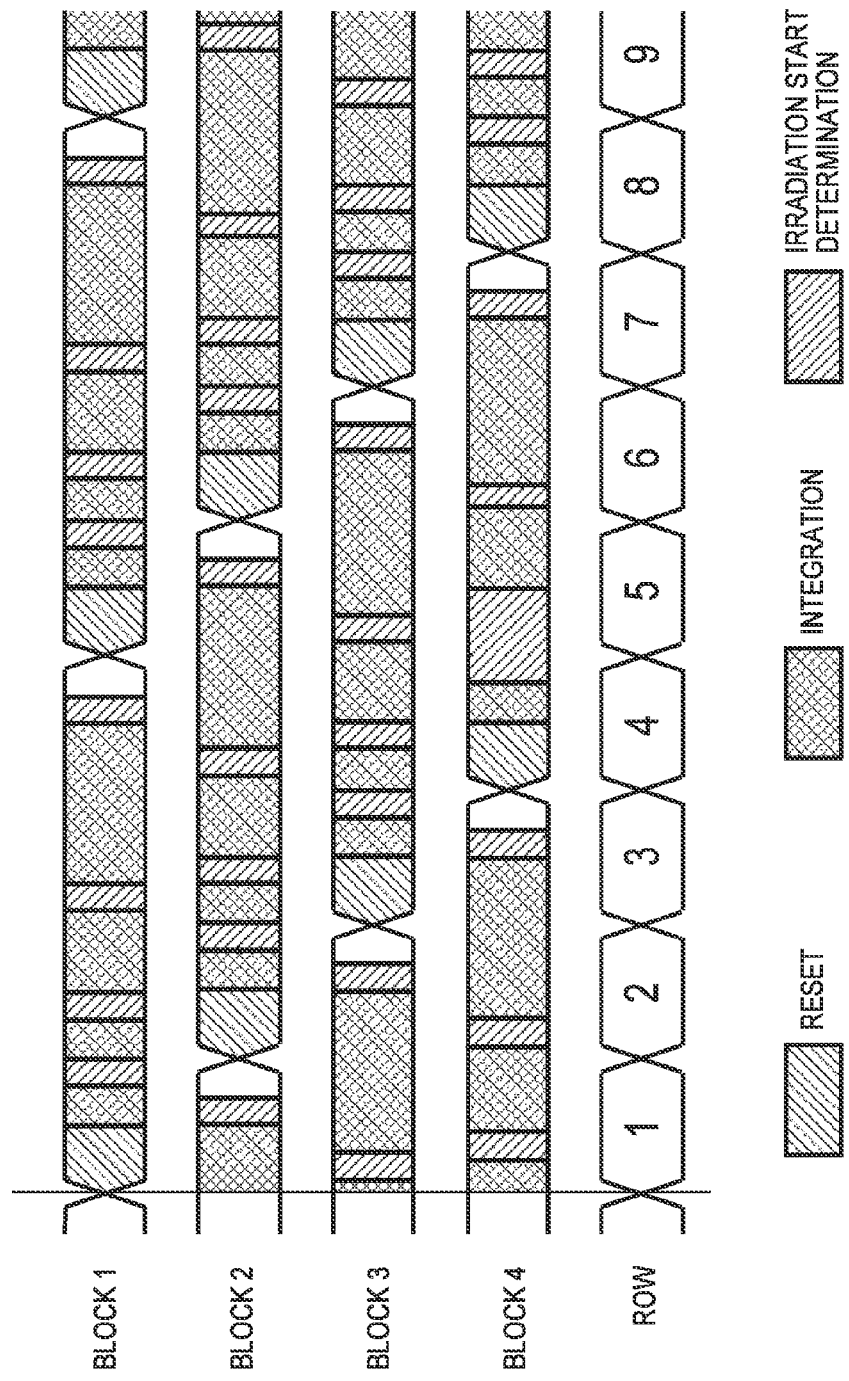
FIG. 9 is a timing chart for explaining the operation of a radiation imaging apparatus according to the second embodiment of the present invention.

FIG. 9 shows the operation of a radiation imaging apparatus 100 according to the second embodiment. For the sake of descriptive simplicity, assume that the time of the initialization operation of four rows is required for detection processing shown in FIG. 7. The number of blocks (integrators) to perform detection processing is 4. The timing at which each block starts calculation is shifted by the time of the initialization operation of one row. In this arrangement, detection processing in one integral interval is performed once per initialization operation of one row. It is therefore possible to shorten the delay time until detection of radiation irradiation.

In the second embodiment, the number of blocks (integrators) is 4, and detection processing requires the time necessary for the initialization operation of four rows. However, the arrangement of the radiation imaging apparatus 100 is not limited to this. For example, the number of blocks (integrators) may be 8, and detection processing may require the time necessary for the initialization operation of 16 rows. In this case, a delay time corresponding to two rows is necessary until detection of radiation irradiation.

Third Embodiment

The third embodiment of the present invention will be described below. For matters that are not mentioned in the third embodiment, the first embodiment can apply equally. In the first embodiment, integration in the plurality of integral intervals is executed using one integrator. In the third embodiment, integration in the plurality of integral intervals is executed using a plurality of integrators. One integrator can be assigned to integration in one integral interval.

Figure 10:
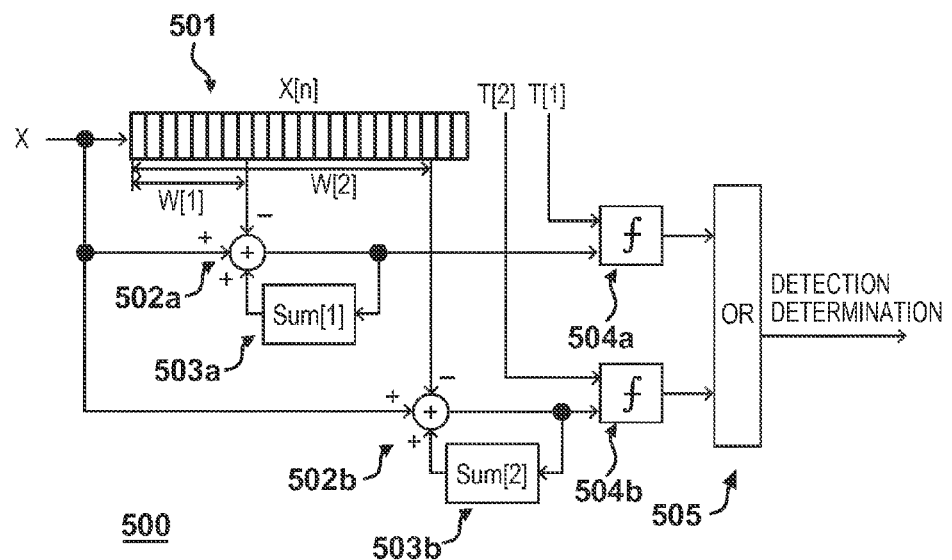
FIG. 10 is a block diagram showing a detection processing block in a radiation imaging apparatus according to the third embodiment of the present invention.

FIG. 10 shows a detection processing block 500 that can be incorporated in a control unit 106. The detection processing block 500 can include a shift register 501, adders 502a and 502b, registers 503a and 503b that hold integrated values, comparators 504a and 504b, and an OR circuit 505. In the third embodiment, an integrated value Sum is not a single value and is defined as the mth integrated value Sum[m]. Latest radiation information is referred to as X.

First, the value X[n] stored in the shift register 501 and the mth integrated value Sum[m] are initialized. This will be referred to as reset of the integrator. Next, every time a clock (not shown) is given to the shift register 501, X[n] stored in the shift register 501 is shifted. That is, the shift register 501 performs processing represented by $$X[n]=X[n-1](n>1)$$

$$X[n]=X(n=0) \qquad (5)$$

The adders 502a and 502b and the registers 503a and 503b that hold the integrated values perform cumulative addition (integration) every time the clock (not shown) is given. That is, the adders 502a and 502b and the registers 503a and 503b perform processing represented by $$Sum[m]=X+Sum[m]-X[W[m]] \qquad (6)$$

The adder 502a and the register 503a form one integrator, and the adder 502b and the register 503b form another integrator.

For example, let $X_k$ be radiation information k clocks after reset. In this case, the value Sum[m] when W[m]=4 changes as follows. Sum[m] is a value obtained by integrating the radiation information X in the integral interval W[m].

$$Sum[m] = 0 \text{ (immediately after reset)}$$

$$Sum[m] = X_1 + 0 - 0 = X_1 \ (k = 1)$$

$$Sum[m] = X_2 + X_1 - 0 = X_2 + X_1 \ (k = 2)$$

$$Sum[m] = X_3 + X_2 + X_1 - 0 = X_3 + X_2 + X_1 \ (k = 3)$$

$$Sum[m] = X_4 + X_3 + X_2 + X_1 - 0 = X_4 + X_3 + X_2 + X_1 \ (k = 4)$$

$$Sum[m] = X_5 + X_4 + X_3 + X_2 + X_1 - 0 = X_5 + X_4 + X_3 + X_2 + X_1 \ (k = 5)$$

$$Sum[m] = X_6 + X_5 + X_4 + X_3 + X_2 + X_1 - 0 =$$

$$X_6 + X_5 + X_4 + X_3 + X_2 + X_1 \ (k = 6)$$

$$\vdots$$

$$Sum[m] = X_K + X_{K-1} + X_{K-2} + X_{K-3} \ (k = K)$$

That is, the integrated value can be calculated in the integral interval decided by the tap (readout position) of the shift register 501. Since such integrated value calculation is completed by one clock, the time required for irradiation start determination can largely be shortened.

When M integrators as described above are arranged, the mth integrated value Sum[m] in the mth integral interval W[m] can be obtained (m=1 to M). In addition, M comparators like the comparators 504a and 504b are arranged. The comparator compares the mth threshold value T[m] with the mth integrated value Sum[m]. If Sum[m]>T[m] in any one of the compactors, it can be determined by the OR circuit 505 that radiation irradiation has started, as in the processing shown in FIG. 7, that is, radiation irradiation can be detected. If Sum[m]>T[m] does not hold in any comparator, it is determined that radiation irradiation is not being performed.

In the arrangement example shown in FIG. 10, an adder and a comparator are provided for each register for holding the integrated value. However, this is merely an example. For example, a plurality of registers may share one adder and one comparator.

The shift register 501 can be formed from one block but may be divided into a plurality of blocks. The plurality of blocks that form the shift register 501 can be implemented in, for example, memory partitions different from each other on FPGA. The arrangement shown in FIG. 10 may be implemented by software.

Fourth Embodiment

The fourth embodiment of the present invention will be described below. For matters that are not mentioned in the fourth embodiment, the third embodiment can apply equally. In the first to third embodiments, (the start of) radiation irradiation is detected based on the bias current signal VSD or the integrated value of the radiation information X that is the result of processing applied to the bias current signal VSD. In the fourth embodiment, (the start of) radiation irradiation is detected based on the difference between at least two integrated values out of a plurality of integrated values.

Figure 11:
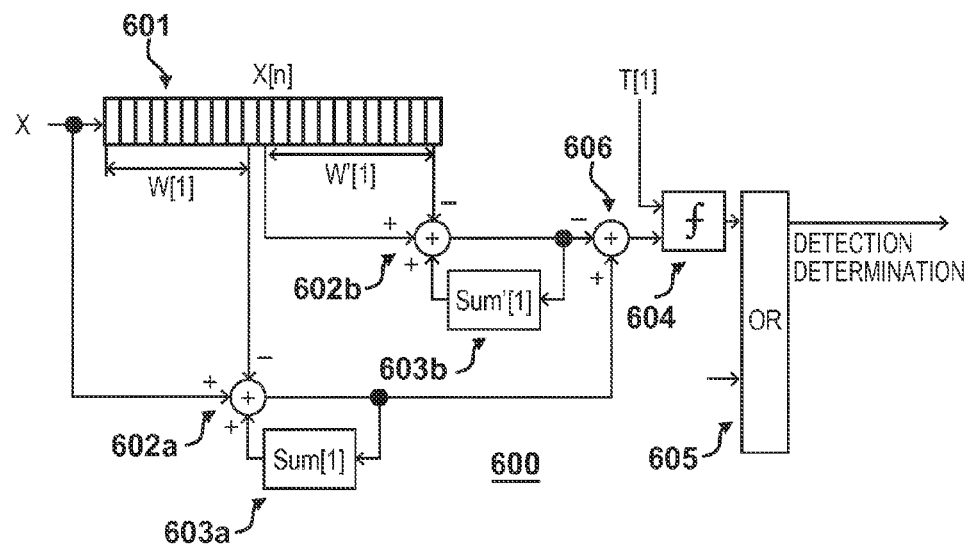
FIG. 11 is a block diagram showing a detection processing block in a radiation imaging apparatus according to the fourth embodiment of the present invention.

FIG. 11 shows a detection processing block 600 that can be incorporated in a control unit 106. The detection processing block 600 can include a shift register 601, adders 602a and 602b, registers 603a and 603b that hold integrated values, a comparator 604, an OR circuit 605, and a subtracter 606. There exist two different mth integral intervals W[m] and W'[m] and two different mth integrated values Sum[m] and Sum'[m].

The adder 602a and the register 603a form one integrator, and the adder 602b and the register 603b form another integrator. Sum[m] is a value obtained by integrating radiation information X in the integral interval W[m]. Sum'[m] is a value obtained by integrating the radiation information X in the integral interval W'[m].

The subtracter 606 outputs the difference between the integrated value Sum[m] and the integrated value Sum'[m]. The comparator 604 compares the difference with a threshold value T[m], thereby determining (the start of) radiation irradiation.

Although FIG. 11 illustrates only the block corresponding to the first integral interval, there exists a plurality of blocks corresponding to the mth integral interval in practice.

In the fourth embodiment, the structure includes two different integral intervals and two different registers for holding integrated values. However, only one register and one integral interval may be included. For example, when W'[m]=W[m+1]−W[m], we obtain $$\operatorname{Sum}[m] - \operatorname{Sum}'[m] = \operatorname{Sum}[m] - (\operatorname{Sum}[m+1] - \operatorname{Sum}[m]) \quad (7)$$

$$= 2 * \operatorname{Sum}[m] - \operatorname{Sum}[m+1]$$

As described above, radiation irradiation is detected by comparing the difference between the integrated values with the threshold value. This makes it possible to reduce low-frequency noise included in the detection value of the current flowing to a bias line Vs. Note that the threshold value T[m] used in the present invention is preferably obtained by performing, for the bias current signal obtained during the time without radiation irradiation, the same processing as that for the detection target bias current.

Figure 12:
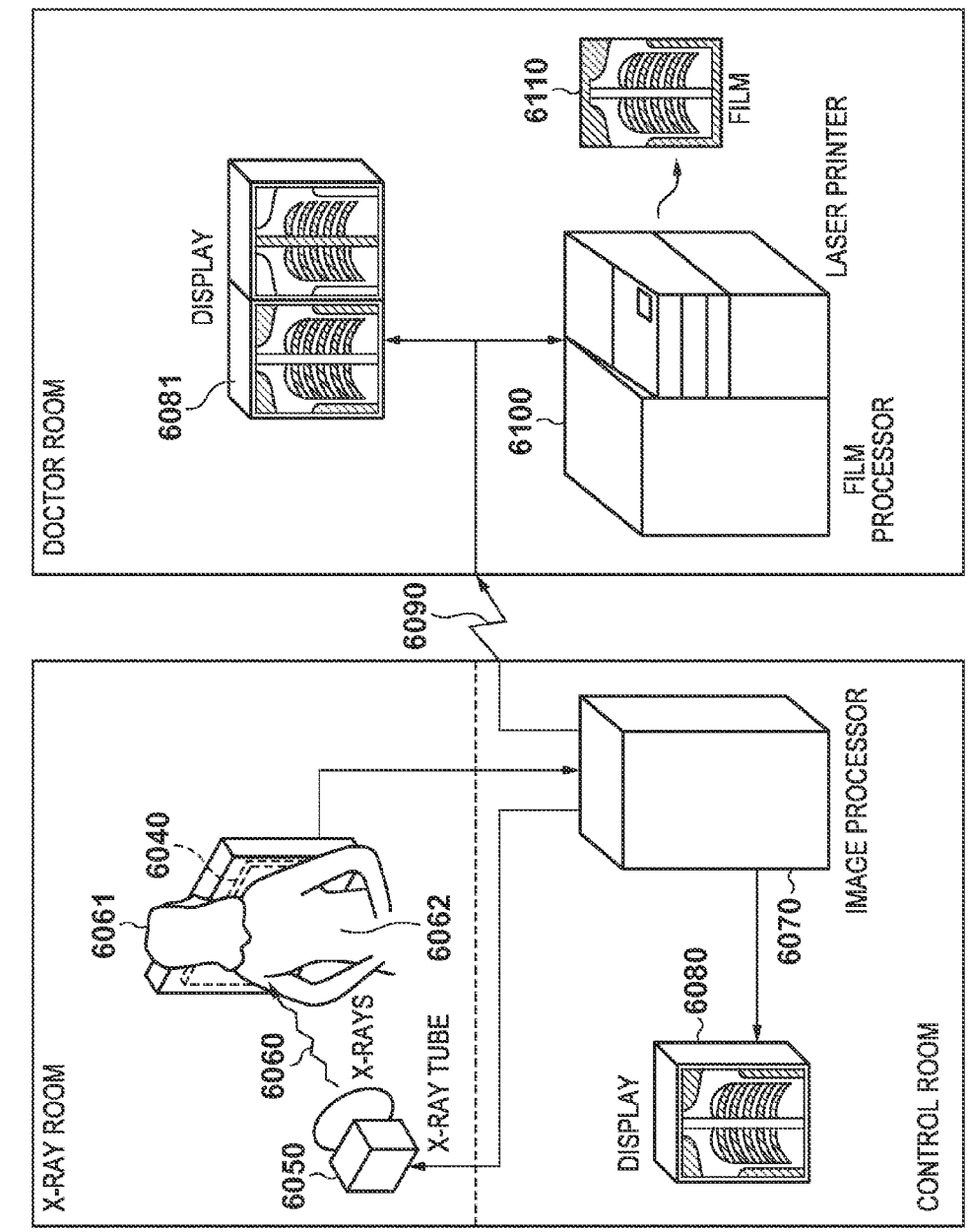
FIG. 12 is a view showing a radiation imaging system.

FIG. 12 is a view showing an example in which the radiation imaging apparatus according to the present invention is applied to an X-ray diagnostic system (radiation imaging system). The radiation imaging system includes a radiation imaging apparatus 6040 (corresponding to the above-described radiation imaging apparatus 100) and an image processor 6070 that processes a signal output from the radiation imaging apparatus 6040. X-rays 6060 generated by an X-ray tube (radiation source) 6050 pass through a chest 6062 of a patient or subject 6061 and enter the radiation imaging apparatus 6040. The X-rays that have entered include the internal information of the subject 6061. The image processor (processor) 6070 can process a signal (image) output from the radiation imaging apparatus 6040 and, for example, displays the image on a display 6080 in the control room based on the signal obtained by the processing.

The image processor 6070 can also transfer the signal obtained by the processing to a remote site via a transmission line 6090. This makes it possible to display the image on a display 6081 arranged in a doctor room in another place or record the image in a recording medium such as an optical disk. The recording medium may be a film 6110. In this case, a film processor 6100 records the image on the film 6110.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-040031, filed Feb. 28, 2013, which is hereby incorporated by reference herein in its entirety.

What is claimed is:

1. A radiation imaging apparatus comprising:
   a pixel array in which a plurality of pixels configured to detect radiation are arrayed to form a plurality of rows and a plurality of columns;
   a detection circuit configured to detect information representative of a radiation dose to the pixel array and output a detection signal corresponding to the information; and
   a control unit configured to perform radiation detection processing until radiation irradiation of the pixel array is detected and to control the pixel array in accordance with the detection, wherein in the radiation detection processing, the control unit integrates either the detection signal or a result of processing applied to the detection signal, in a plurality of integral intervals which are different from each other, and detects the radiation irradiation of the pixel array based on comparison between a threshold value and an integrated value obtained by the integration.

2. The apparatus according to claim 1, wherein each of the plurality of pixels includes a converter configured to generate and accumulate charges corresponding to the radiation dose, and
   the detection circuit outputs, as the detection signal, a signal corresponding to a current flowing to a bias line that gives a bias potential to the converter.

3. The apparatus according to claim 2, wherein the control unit controls the pixel array so as to repeat an initialization operation of sequentially initializing the plurality of pixels of the pixel array in units of at least one row, until radiation irradiation is detected.

4. The apparatus according to claim 3, wherein each of the plurality of pixels further includes a switch element configured to connect the converter to a signal line, and is configured to output a signal corresponding to the charges accumulated in the converter to the signal line,
   wherein the initialization operation includes an operation of setting the switch element of each pixel of a row to be initialized in a conductive state, and
   the processing includes obtaining a difference between the detection signal when the switch element is in the conductive state and the detection signal when the switch element is in a nonconductive state.

5. The apparatus according to claim 4, wherein the processing further includes obtaining a difference between the latest difference and the preceding difference for the same row.

6. The apparatus according to claim 3, wherein the processing includes obtaining a difference between the latest detection signal and the preceding detection signal for the same row.

7. The apparatus according to claim 1, wherein the control unit detects radiation irradiation of the pixel array based on a difference between at least two integrated values out of a plurality of integrated values obtained by integrations in the plurality of integral intervals.

8. The apparatus according to claim 7, wherein the control unit detects radiation irradiation of the pixel array based on a difference between at least two integrated values obtained by integrations.

9. The apparatus according to claim 1, wherein the control unit detects radiation irradiation of the pixel array based on comparison between the threshold value and a plurality of integrated values obtained by integrations in the plurality of integral intervals.

10. The apparatus according to claim 9, wherein the control unit detects radiation irradiation of the pixel array when one of the plurality of integrated values exceeds the corresponding threshold value.

11. The apparatus according to claim 9, wherein the control unit outputs information representing the integral interval associated with the integrated value that exceeds the corresponding threshold value out of the plurality of integrated values.

12. The apparatus according to claim 1, wherein the control unit performs integration for the plurality of integral intervals using a single integrator.

13. The apparatus according to claim 1, wherein the control unit performs integration for the plurality of integral intervals using a plurality of integrators.

14. The apparatus according to claim 1, wherein start times of the plurality of integral intervals are different from each other, and in each of the plurality of integral intervals, start time of an integral interval is earlier than end time of the integral interval.

15. A radiation imaging apparatus comprising:
a pixel array in which a plurality of pixels configured to detect radiation are arrayed to form a plurality of rows and a plurality of columns;
a detection circuit configured to detect information representative of a radiation dose to the pixel array and output a detection signal corresponding to the information; and
a control unit configured to detect radiation irradiation of the pixel array based on a plurality of integrated values obtained by integrating either the detection signal or a result of processing applied to the detection signal, in a plurality of integral intervals and to control the pixel array in accordance with the detection,
wherein the control unit detects radiation irradiation of the pixel array based on comparison between a threshold value and the plurality of integrated values, and
wherein a unique threshold value is assigned to each of the plurality of integral intervals.

16. A radiation imaging apparatus comprising:
a pixel array in which a plurality of pixels configured to detect radiation are arrayed to form a plurality of rows and a plurality of columns;
a detection circuit configured to detect information representative of a radiation dose to the pixel array and output a detection signal corresponding to the information; and
a control unit configured to detect radiation irradiation of the pixel array based on a plurality of integrated values obtained by integrating either the detection signal or a result of processing applied to the detection signal, in a plurality of integral intervals and to control the pixel array in accordance with the detection,
wherein the control unit detects radiation irradiation of the pixel array based on comparison between a threshold value and the plurality of integrated values, and
wherein the control unit detects radiation irradiation of the pixel array when a predetermined number of integrated values including at least two of the plurality of integrated values exceed the corresponding threshold values.

17. A radiation imaging apparatus comprising:
a pixel array in which a plurality of pixels configured to detect radiation are arrayed to form a plurality of rows and a plurality of columns;
a detection circuit configured to detect information representative of a radiation dose to the pixel array and output a detection signal corresponding to the information; and
a control unit configured to detect radiation irradiation of the pixel array based on a plurality of integrated values obtained by integrating either the detection signal or a result of processing applied to the detection signal, in a plurality of integral intervals and to control the pixel array in accordance with the detection,
wherein the control unit detects radiation irradiation of the pixel array based on comparison between a threshold value and the plurality of integrated values, and
wherein letting W be a length of one integral interval out of the plurality of integral intervals, and T be the threshold value assigned to the one integral interval, the length of another integral interval out of the plurality of integral intervals is k×W (k is a real number larger than 1), and the threshold value assigned to the other integral interval is T×√k.

18. A radiation imaging apparatus comprising:
a pixel array in which a plurality of pixels configured to detect radiation are arrayed to form a plurality of rows and a plurality of columns;
a detection circuit configured to detect information representative of a radiation dose to the pixel array and output a detection signal corresponding to the information; and
a control unit configured to detect radiation irradiation of the pixel array based on a plurality of integrated values obtained by integrating either the detection signal or a result of processing applied to the detection signal, in a plurality of integral intervals and to control the pixel array in accordance with the detection,
wherein letting W be the length of an mth integral interval (m is a natural number), the length of an (m+1)th integral interval is k×W (k is a real number larger than 1).

19. A radiation imaging system comprising:
a pixel array in which a plurality of pixels configured to detect radiation are arrayed to form a plurality of rows and a plurality of columns;
a detection circuit configured to detect information representative of a radiation dose to the pixel array and output a detection signal corresponding to the information;
a control unit configured to perform radiation detection processing until radiation irradiation of the pixel array is detected and to control the pixel array in accordance with the detection, wherein in the radiation detection processing, the control unit integrates either the detection signal or a result of processing applied to the detection signal, in a plurality of integral intervals which are different from each other, and detects the radiation irradiation of the pixel array based on comparison between a threshold value and an integrated value obtained by the integration; and a processor configured to process a signal output from the radiation imaging apparatus.

20. A method of controlling a pixel array comprising a plurality of pixels configured to detect radiation, the method comprising obtaining a detection signal from the pixel array representative of a radiation dose to the pixel array, performing radiation detection processing until radiation irradiation of the pixel array is detected, wherein the radiation detection processing includes integrating either the detection signal or a result of processing applied to the detection signal, in a plurality of integral intervals which are different from each other, and detecting the radiation irradiation of the pixel array based on comparison between a threshold value and an integrated value obtained by the integration, and controlling the pixel array in dependence upon the integrated values detection of the radiation irradiation of the pixel array.

21. A radiation imaging apparatus comprising:

a pixel array in which a plurality of pixels configured to detect radiation are arrayed to form a plurality of rows and a plurality of columns;

a detection circuit configured to output a detection signal representative of a radiation dose to the pixel array; and a control unit configured to perform radiation detection processing until radiation irradiation of the pixel array is detected, wherein in the radiation detection processing, the control unit repeatedly performs, during a period, based on an integrated value provided by integrating either the detection signal or a result of processing applied to the detection signal, determining whether the pixel array is irradiated with the radiation without resetting the integration.

wherein the control unit resets the integration and continues the radiation detection processing for a next period in a case that the radiation irradiation of the pixel array is not detected in the period, and the control unit terminates the radiation detection processing in a case that the radiation irradiation of the pixel array is detected in the period, and the control unit controls the pixel array in accordance with the detection.

22. The apparatus according to claim 21, wherein each of the plurality of pixels includes a converter configured to generate and accumulate charges corresponding to the radiation dose, and the detection circuit outputs, as the detection signal, a signal corresponding to a current flowing to a bias line that gives a bias potential to the converter.

23. The apparatus according to claim 22, wherein the control unit controls the pixel array so as to repeat an initialization operation of sequentially initializing the plurality of pixels of the pixel array in units of at least one row, until radiation irradiation is detected.

24. The apparatus according to claim 23, wherein each of the plurality of pixels further includes a switch element configured to connect the converter to a signal line, and is configured to output a signal corresponding to the charges accumulated in the converter to the signal line, wherein the initialization operation includes an operation of setting the switch element of each pixel of a row to be initialized in a conductive state, and the processing includes obtaining a difference between the detection signal when the switch element is in the conductive state and the detection signal when the switch element is in a nonconductive state.

25. The apparatus according to claim 24, wherein the processing further includes obtaining a difference between the latest difference and the preceding difference for the same row.

26. The apparatus according to claim 23, wherein the processing includes obtaining a difference between the latest detection signal and the preceding detection signal for the same row.

27. The apparatus according to claim 21, wherein the control unit detects radiation irradiation of the pixel array based on comparison between a threshold value and a plurality of integrated values provided by integrating either the detection signal or a result of processing applied to the detection signal, in a plurality of integral intervals which are different from each other.

28. The apparatus according to claim 27, wherein a unique threshold value is assigned to each of the different integral intervals.

29. The apparatus according to claim 27, wherein the control unit detects radiation irradiation of the pixel array when one of the plurality of integrated values exceeds the corresponding threshold value.

30. The apparatus according to claim 27, wherein the control unit detects radiation irradiation of the pixel array when a predetermined number of integrated values including at least two of the plurality of integrated values exceed the corresponding threshold values.

31. The apparatus according to claim 27, wherein the control unit outputs information representing the integral interval associated with the integrated value that exceeds the corresponding threshold value out of the plurality of integrated values.

32. The apparatus according to claim 21, wherein in a plurality of integral intervals in the period, letting W be the length of an mth integral interval (m is a natural number), the length of an (m + 1)th integral interval is k x× W (k is a real number larger than 1).

33. The apparatus according to claim 32, wherein the control unit performs integration for the plurality of integral intervals using a single integrator.

34. The apparatus according to claim 32, wherein the control unit performs integration for the plurality of integral intervals using a plurality of integrators.

35. A radiation imaging system comprising:

a pixel array in which a plurality of pixels configured to detect radiation are arrayed to form a plurality of rows and a plurality of columns;

a detection circuit configured to output a detection signal representative of a radiation dose to the pixel array;

a control unit configured to perform radiation detection processing until radiation irradiation of the pixel array is detected, wherein in the radiation detection processing, the control unit repeatedly performs, during a period, based on an integrated value provided by integrating either the detection signal or a result of processing applied to the detection signal, determining whether the pixel array is irradiated with the radiation without resetting the integration.

wherein the control unit resets the integration and continues the radiation detection processing for a next period in a case that the radiation irradiation of the pixel array is not detected in the period, and the control unit terminates the radiation detection processing in a case that the radiation irradiation of the pixel array is detected in the period, and the control unit controls the pixel array in accordance with the detection; and a processor configured to process a signal output from the radiation imaging apparatus.

36. A method of controlling a pixel array comprising a plurality of pixels configured to detect radiation, the method comprising:

obtaining a detection signal from the pixel array representative of a radiation dose to the pixel array, and performing radiation detection processing until radiation irradiation of the pixel array is detected, wherein the radiation detection processing includes repeatedly performing, during a period, based on an integrated value provided by integrating either the detection signal or a result of processing applied to the detection signal, determining whether the pixel array is irradiated with the radiation without resetting the integration, wherein the integration is reset and the radiation detection processing is continued for a next period in a case that the radiation irradiation of the pixel array is not detected in the period, and the radiation detection processing is terminated in a case that the radiation irradiation of the pixel array is detected in the period, and controlling the pixel array in accordance with the detection.

* * * * *